United States Patent [19]

Fukuwatari et al.

[11] 4,085,001
[45] Apr. 18, 1978

[54] FIBER REINFORCED CEMENTITIOUS SUBSTRATE

[75] Inventors: Tadashi Fukuwatari, Tokyo; Kiyotaka Mishima, Kawasaki; Hiroshi Ichimura, Ichikawa; Hideaki Kurihara, Yokohama, all of Japan

[73] Assignee: Asahi Glass Company, Ltd., Tokyo, Japan

[21] Appl. No.: 701,220

[22] Filed: Jun. 30, 1976

[30] Foreign Application Priority Data
Jul. 11, 1975 Japan .................. 50-84416
Jul. 18, 1975 Japan .................. 50-87218

[51] Int. Cl.² ............. D21F 11/02; D21F 11/06; B28B 1/26
[52] U.S. Cl. ................... 162/145; 106/99; 162/154; 162/156; 162/225; 264/86; 264/333
[58] Field of Search ............ 106/99; 264/86, 333; 162/145, 146, 147, 148, 154, 156, 225

[56] References Cited

U.S. PATENT DOCUMENTS

| | | | |
|---|---|---|---|
| 2,110,053 | 3/1938 | Phillips | 106/99 X |
| 3,344,015 | 9/1967 | Nepl | 162/154 X |
| 3,354,031 | 11/1967 | Kozacik | 106/99 X |
| 3,951,735 | 4/1976 | Kondo | 162/145 X |
| 3,969,567 | 7/1976 | Occleshaw | 106/99 X |
| 3,972,972 | 8/1976 | Yano | 106/99 X |
| 3,974,024 | 8/1976 | Yano | 264/87 X |
| 3,985,610 | 10/1976 | Pomerhn | 162/154 X |

*Primary Examiner*—Thomas P. Pavelko
*Attorney, Agent, or Firm*—Oblon, Fisher, Spivak, McClelland & Maier

[57] ABSTRACT

A process for preparing glass-fiber-reinforced cement sheets by dewatering a slurry wherein at least one member selected from asbestos, cotton, flax, hemp, wool, or silk fibers is added to the aqueous cement-glass fiber slurry. The sheets so produced have increased bending strengths and improved peeling resistance.

12 Claims, 1 Drawing Figure

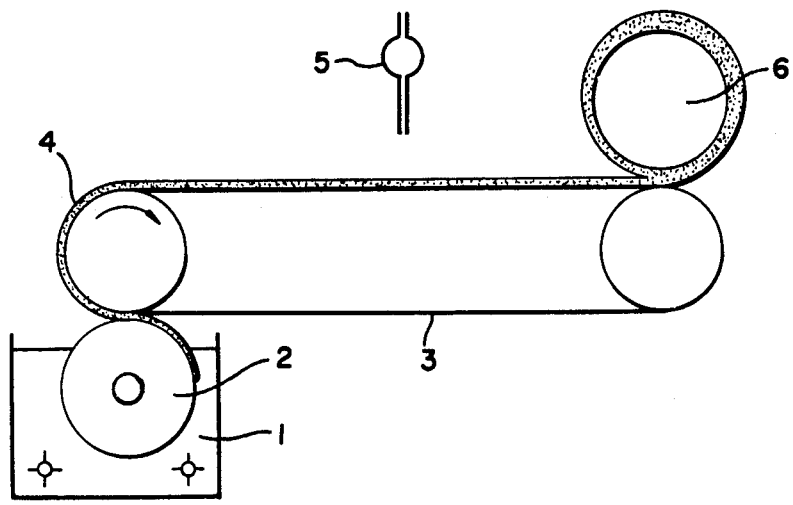

FIBER REINFORCED CEMENTITIOUS SUBSTRATE

BACKGROUND OF THE INVENTION

The present invention relates to a process for preparing a glass fiber reinforced cementitious substrate.

Asbestos cementitious substrates have been used as substrates having high strength in thin thickness and excellent non-combustible property and have been prepared in mass production.

However, the coventional asbestos cementitious substrates have disadvantageously low impact strength and have been broken by certain shock of stone and others when the asbestos cementitious substrate is used for a soundproof wall, a chimney, a roof or the like.

In order to increase the strength, it has been proposed to increase a content of asbestos. However, it has not succeeded to give enough impact strength. On the other hand, it has not desirable to increase the content of asbestos from the viewpoint of pollution and resources.

Pulp cementitious substrates have been also used for the same purposes, however, they have been unsatisfactory from the viewpoints of impact strength and non-combustible property.

It has been considered to blend synthetic fibers, rock wool, slag wool or the like as well as asbestos or pulp. However, they have been also unsatisfactory and have not been practically used.

Recently, glass fibers having alkali resistance have been developed and glass fiber reinforced cementitious substrates have been practically used.

The glass fiber reinforced cementitious substrates have high bending strength and high impact strength even though a content of glass fiber is small in comparison with the other fibers such as asbestos. However, it has not been succeeded to attain a mass production by the sheeting method.

When a slurry of cementitious material containing only glass fiber has been used in the sheeting method, like Hatchek process, magniani process or etc. a vat level has been too low to operate the sheeting method. When the tests have been carried out by increasing a feeding rate of the slurry or the like, the times for taking up on making roll have been remarkably increased, and the product has been easily peeled off at each layer and the strengths of the product has been too low for a practical use. The inventors have studied to prepare glass fiber reinforced cementitious substrates by the sheeting method.

The followings are the definitions of the terms used in the specification.

wet film: a slurry is filtered to remain wet solid components on a wire or felt in a form of wet film.
green sheet: a wet film is wound on a making roll to give a tubular wet sheet, which can be cut to form a plane sheet.
cementitious substrate: a green sheet is cured to form cementitious substrate.

SUMMARY OF THE INVENTION

It is an object of the present invention to provide a process for preparing a glass fiber reinforced cementitious substrate having high strength in a mass production.

It is another object of the invention to provide a process for preparing a glass fiber reinforced cementitious substrate having excellent bending strength and tensile strength as those of asbestos cementitious substrate and remarkably higher impact strnegth in comparison with that of the asbestos cementitious substrate under desirable sheeting operation by blending specific amounts of glass fiber with a small amount of asbestos, cotton, flax, hemp, wools or silk to a cementitious material to form a slurry.

These objects of the invention have been attained by blending 1 to 10 wt.% of glass fiber, 1 to 10 wt.% of asbestos or 0.03 to 5 wt.% of cotton, flax, hemp, wools or silk to a cementitious material to prepare a slurry and sheeting the slurry under passing water through a wire of the sheeting machine and transferring the solid components on a wire to a endless felt as a wet film and taking up wet film on a making roll.

BRIEF DESCRIPTION OF THE DRAWING

FIG. 1 is a schematic view of Hatchek type sheet machine used for the process of the present invention.

DETAILED DESCRIPTION OF THE PREFERRED EMBODIMENTS

When a fiber selected from the group consisting of cotton, flax, hemp, wools and silk is added together with glass fiber and pulp, an amount of asbestos can be decreased. Even though no asbestos is blended, a glass fiber reinforced cementitious substrate having peeling resistance can be prepared by the sheeting method.

A sheeting apparatus for asbestos cementitious substrate can be employed without or with slight modification.

An amount of the fiber of cotton, flax, hemp, wool or silk can be remarkably small in comparison with the amount of asbestos.

The sheeting operation has been hard to attain by blending the same amount of the other fiber such as rock wool, polypropylene or the like and the peeling is easily caused in the setting step.

The process of the present invention is carried out by sheeting a slurry of (A) 1 to 10 wt.% of glass fiber; (B) 1 to 10 wt.% of asbestos or (B') 0.03 to 5 wt.% of a fiber selected from the group consisting of cotton, flax, hemp, wools and silk; (C) pulp and (D) cementitious material with water, and taking up the film on a making roll.

More particularly, a slurry of water and solid components of (A) 1 to 10 wt.% of glass fiber;
(B) 1 to 10 wt.% of asbestos;
(C) 0 to 10 wt.% of pulp and
(D) 80 to 90 wt.% of a cementitious material with water can be used.

A slurry of (A) 1 to 10 wt.% of glass fiber; (B') 0.03 to 5 wt.% of a fiber selected from the group consisting of cotton, flax, hemp, wools and silk; (C) 3 to 10 wt.% of pulp and (D) 75 to 95.97 wt.% of a cementitious material (asbestos can be added) with water can be also used.

In the process of the invention, said slurry is continuously sheeted under passing water through the wire to form a wet fiber reinforced cementitious film (wet film) and the film is taken up on a making roll to give a desirable thickness as a green sheet.

As the sheeting method, the Hatchek process (cylindrical process), Magniani process (endless belt process) or the like can be employed to prepare a wet thin fiber reinforced cementitious film (wet film) by sheeting the slurry under passing water through the wire.

The optimum result can be attained by employing the Hatchek process. In the sheeting operation, the slurry has a solid content of 2 to 20 wt.% preferably 5 to 10 wt.% especially 7 to 8 wt.% in the vat for Hatchek machine, and a solid content of 5 to 30 wt.% preferably 10 to 20 wt.% especially about 15 wt.% in an inlet box for Magniani machine.

The slurry is flowed out on the wire through which water is passed and the solid components are remained on the wire and are transferred on a wire of an endless felt as a wet film.

The wet film on the endless felt is taken up on a making roll so as to get a desired thickness of the green sheet in cylindrical form.

Referring to FIG. 1 of a schematic view of the Hatchek process apparatus, one embodiment of the invention will be illustrated.

A slurry is prepared by blending glass fiber, asbestos or the specific fiber selected from the group consisting of cotton, flax, hemp, wools and silk and a pulp and a Portland cement with water.

The slurry is continuously fed in a vat (1) and is flowed out on a wire gauze type cylindrical roll (2) and is transferred on an endless felt (3) to form a wet thin fiber reinforced cementitious film (wet film) (4).

If desired, glass fiber such as chopped strand of glass fiber is fed from a glass fiber feeding mechanism (5) on the wet film and the wet film is taken up on a making roll (6) to give a desired thickness and the wound green sheet on the making roll is taken out and is used as a tubular substrate or is cut to form a plate substrate.

The glass fiber used in the invention is preferably an alkali resistant glass fiber having a length of 3 to 100 mm in a filament or strand form. It is possible to filamentize a part or whole of the strand of glass fiber in the step of blending the fibers to the cementitious material or the step of mixing them in the vat with an agitator.

The amount of glass fiber is preferably in a range of 1 to 10 wt.% to total mixture of the fibrous materials and the cementitious materials.

When it is less than 1 wt.%, the strength of the cementitious substrate is too low to use it in practical purpose. When it is more than 10 wt.%, the sheeting characteristic is too low and the surface of the glass fiber reinforced cementitious substrate is nappy.

When it is in a range of 2 to 8 wt.%, the optimum results can be obtained from the viewpoints of the strengths and the sheeting characteristics. The glass fiber is usually blended to the cementitious material to form the slurry.

However, it is possible to feed a part of the glass fiber on the endless felt whereby the directionality of strength can be decreased but the peeling property is slightly increased.

Continuous filaments or continuous strands of glass fiber can be used in the case.

The asbestos used in the process of the invention can be various types of asbestos such as Chrysotile asbestos, Amosite asbestos, etc..

When the organic fiber is not blended, 1 to 10 wt.% of asbestos to total mixture of the fibrous materials and the cementitious materials is blended. When it is less than 1 wt.%, it is disadvantageous to attain the sheeting operation because of lowering level in the vat, increase of times for taking up on a making roll, and increase of a ratio of the discharged water. When it is more than 5 wt.%, the effect for increasing strength is not improved and the sheeting characteristic is not further improved.

When it is more than 10 wt.%, the intertwined phenomenon between asbestos and glass fiber is disadvantageously caused to form fiber lumps whereby unevenness of strength may be caused.

Pulps used in the process of the invention can be needle-leaved pulp, broad-leaved pulp, reproduced pulp or the like which have been used in the conventional asbestos cements and pulp cements.

The content of pulp is usually in a range of 0 to 10 wt.% preferably 1 to 10 wt.% to total mixture of the fibrous materials and the cementitious materials.

When it is less than 1 wt.%, an amount of solid components in a discharged water is increased and the sheeting characteristic is decreased. When it is more than 10 wt.%, the noncombustible property and the heat resistance of the cementitious substrate are disadvantageously decreased. It is especially preferable to add 1 to 7 wt.% of the pulp from the viewpoints of the sheeting characteristic and the amounts of solid components in the discharged water.

It is preferable to use needle-leaved pulp. When the content of asbestos is low, the content of pulp is preferably high. When the content of asbestos is high, the content of pulp is preferably low.

Total content of asbestos and pulp is preferably in a range of 3 to 15 wt.% especially 4 to 10 wt.% (2 to 5 wt.% of asbestos and 1 to 7 wt.% of pulp) to total mixture of the fibrous materials and the cementitious material. When the total content of asbestos and pulp is in a range of 2 to 4 wt.% especially less than 3 wt.%, the vat level is slightly lower than a desired level to cause increase of times for taking up and increase of a ratio of discharged water.

When it is in a range of 10 to 15 wt.%, the increase of strength depending upon increase of them is not remarkable.

When it is more than 12 wt.%, the decrease of strength depending upon increase of them may be sometimes found.

When the specific fiber selected from the group consisting of cotton, flax, hemp, wools and silk is used, it is preferable to blend 0.03 to 5 wt.% of the specific fiber having a length of 0.5 to 20 mm.

It is possible to use one or more of the specific fibers.

It is especially preferable to blend about 0.1 to 3 wt.% of the specific fiber to total mixture of the fibrous materials and the cementitious material from the viewpoint of the sheeting characteristic. The addition of cotton or wool is superior to that of silk, flax, or hemp especially in the case of low content of the specific fiber.

When it is less than 0.1 wt.%, the peeling off is sometimes caused.

When it is less than 0.03 wt.%, the peeling off is easily caused to be not enought to impart a desired strength.

The phenomenon of peeling off is frequently caused by using silk, flax, or hemp.

When it is more than 3 wt.%, the wet film (the solid components on the felt transferred from the wire cylinder) adhered on the endless felt is increased to easily cause partial falling of the wet film whereby the control of the sheeting operation becomes hard. When it is more than 5 wt.%, the phenomenon is frequently caused.

In the optimum embodiment from the viewpoints of the sheeting characteristic, the strengths and economical matters, the content of the specific fiber is in a range of about 0.2 to 1 wt.% and the specific fiber is cotton, wool or a mixture thereof.

The pulp used in the above-mentioned case, can be also added.

The content of pulp is preferably in a range of 3 to 10 wt.% to total mixture of the fibrous materials and the cementitious materials.

When it is less than 3 wt.%, the sheeting characteristic is disadvantageously low.

When it is more than 10 wt.%, the noncombustible property and shrinking property are not desired.

The cementitious materials used in the process of the invention can be hydraulic inorganic materials such as Portland cement, Roman cement, natural cement, alumina cement, hydraulic lime and mixtures thereof. They should have suitable setting speed to be deformable during the sheeting step.

The cementitious materials can include the main component of hydraulic inorganic material and the other additives in a degree not to cause adverse effect for the sheeting step.

The additives include aggregates such as sand, slag, light aggregates, the other fibrous materials and Pozzolana, and the other additives of resins, blowing agents, coloring agents, setting speed regulators, chemical resistant agents, water-proofing agents or the like.

It is preferable to add a cationic or nonionic surfactant such as polyacrylamide in order to improve the sheeting characteristic.

In the process of the invention, glass fiber and the specific fiber of cotton, flax, hemp, wool or silk are separately prepared in usual. However, it is possible to prepare composite filaments of glass fiber and the specific fiber at desired ratio and then to cut the composite filaments in desired length.

That is, a composite strand prepared by loosely winding 1/5 times by weight of cotton yarn around glass strand or a composite strand prepared by binding 1/10 times by weight of cotton yarn around glass strand with a binder or a composite strand prepared by binding 1/20 times by weight of cotton staple having a length of 2 mm around glass strand with a binder can be used for the process of the invention by cutting the composite strand in desirable length.

The invention will be illustrated in detail by certain examples.

In the tests, otherwise specificed chopped strand prepared by cutting alkali resistant glass fiber roving "Cem-FIL" manufactured by Pilkington Brothers Ltd. in a length of 10 mm and needle-leave pulp and the specific fiber prepared by cutting cotton, flax, hemp wool or silk yarn in a length of 2 mm were respectively used.

Portland cement was used as the main component of the cementitious material.

Each green sheet was prepared by employing the Hatchek sheeting apparatus for asbestos cement having two vats.

The green sheet was set to form a glass fiber reinforced cementitious sheet, and the sheet was cut in a size of a length of 150 mm, a width of 100 mm and a thickness of 5 mm to obtain each test piece which was used for various tests.

The strengths shown in tables were measured as the longitudinal direction for the running direction in the preparation.

The bending strengths of the test pieces were measured by Japanese Industrial Standard A 1408.

The impact strengths of the test pieces were measured by employing the Izod type tester.

The times for taking up means times for taking up the green glass fiber reinforced cementitious film to form a green sheet having a thickness of 5 mm on the making roll.

The peeling property was shown by rating as follows.
A: no peeling off
B: substantially unpeeling off
C: slightly peeling off
E: peeling off In Experiments No. 1 to 24, the glass fiber-asbestos-pulp type slurry was used.

In Experiments 25, the slurry for the conventional asbestos slate was used.

In Experiments No. 26 to 49, the glass fiber-cotton, flax, wool or silkpulp type slurry was used.

Table 1

| Experiment No. | No. 1 | No. 2 | No. 3 | No. 4 | No. 5 |
|---|---|---|---|---|---|
| Glass fiber (wt.%) | 0 | 0.5 | 1 | 2.5 | 5 |
| Asbestos (wt.%) | 3 | 3 | 4 | 2 | 4 |
| Pulp (wt.%) | 3 | 2 | 4 | 5 | 3 |
| Bending strength (kg/cm$^2$) | 120 | 140 | 178 | 205 | 260 |
| Impact strength (Kg · cm/cm$^2$) | 2 | 3.5 | 7 | 9.5 | 10.5 |
| Times for taking up (times) | 8 | 9 | 6 | 7 | 7 |
| Peeling property | A | B | A | B | A |
| Others Note: | | | | | |

| Experiment No. | No. 6 | No. 7 | No. 8 | No. 9 | No. 10 |
|---|---|---|---|---|---|
| Glass fiber (wt.%) | 8 | 10 | 12 | 5 | 6 |
| Asbestos (wt.%) | 2.5 | 3 | 3 | 0 | 0.5 |
| Pulp (wt.%) | 1 | 3 | 3 | 4 | 4 |
| Bending strength (kg/cm$^2$) | 281 | 305 | 293 | | |
| Impact strength (Kg · cm/cm$^2$) | 10 | 12.5 | 11 | | |
| Times for taking up (times) | 11 | 11 | 12 | 25 | 22 |
| Peeling property | C | B | C | E | E |
| Others Note: | | | *1 | | |

| Experiment No. | No. 11 | No. 12 | No. 13 | No. 14 | No. 15 |
|---|---|---|---|---|---|
| Glass fiber (wt.%) | 6 | 3 | 3 | 5 | 5 |
| Asbestos (wt.%) | 1 | 3 | 5 | 11 | 3 |
| Pulp (wt.%) | 5 | 5 | 6 | 2 | 0 |
| Bending strength (kg/cm$^2$) | 259 | 245 | 249 | 263 | 220 |
| Impact strength (Kg · cm/cm$^2$) | 10 | 9.5 | 10 | 11 | 7.5 |
| Times for taking up (times) | 10 | 7 | 6 | 7 | 13 |
| Peeling property | C | A | A | A | C |
| Others Note: | | | | *2 | |

| Experiment No. | No. 16 | No. 17 | No. 18 | No. 19 | No. 20 |
|---|---|---|---|---|---|
| Glass fiber | | | | | |

Table 1-continued

| | | | | | |
|---|---|---|---|---|---|
| (wt.%) | 5 | 6 | 5 | 4 | 5 |
| Asbestos (wt.%) | 3 | 1.5 | 5 | 3 | 3 |
| Pulp (wt.%) | 0.5 | 1 | 2 | 5 | 9 |
| Bending strength (kg/cm$^2$) | 230 | 206 | 261 | 255 | 233 |
| Impact strength (Kg·cm/cm$^2$) | 8 | 7.5 | 10.5 | 10 | 9 |
| Times for taking up (times) | 12 | 12 | 8 | 8 | 7 |
| Peeling property | C | C | A | A | A |
| Others Note: | | | | | |

| Experiment No. | No. 21 | No. 22 | No. 23 | No. 24 | No. 25 |
|---|---|---|---|---|---|
| Glass fiber (wt.%) | 5 | 6 | 7 | 5 | 0 |
| Asbestos (wt.%) | 2 | 3 | 2 | 3 | 15 |
| Pulp (wt.%) | 12 | 3 | 2 | 2 | 3 |
| Bending strength (kg/cm$^2$) | 206 | 255 | 272 | 237 | 240 |
| Impact strength (Kg·cm/cm$^2$) | 8 | 10 | 10 | 9.5 | 2.5 |
| Times for taking up (times) | 6 | 8 | 10 | 9 | 6 |
| Peeling property | A | A | A | A | A |
| Others Note: | *3 | *4 | *5 | *6 | *7 |

In Experiments Nos. 1 to 8, the content of glass fiber was varied. When the content of glass fiber was less than 1 wt.% as Experiments Nos. 1 and 2, both of the bending strength and the impact strength were too low. When the content of glass fiber was more than 8 wt.% as Experiments Nos. 6, 7 and 8, the times for taking up were increased and the slight peeling off was found.

In Experiment No. 6, the content of glass fiber was 8 wt.% and the contents of asbestos and pulp were relatively small as 2.5 wt.% and 1 wt.%. It seems to affect to increase the times for taking up and to cause slight peeling off.

The content of glass fiber in Experiment No. 8 was more than that of No. 7 whereby both of the bending strength and the impact strength were lower and the times for taking up was increased and the peeling property was deteriorated.

In Experiments No. 3 and 4 wherein the contents of glass fiber were relatively small, the bending strength was slightly lower than that of No. 25 of asbestos slate but the impact strength was about 3 times to that of No. 25 and the times for taking up was substantially same.

In Experiment No. 5 which is one of the optimum cases, the bending strength was higher than that of the asbestos slate and the impact strength was about 4 times to that of the asbestos slate, and the times for taking up and the peeling property were substantially same with those of the asbestos slate.

In Experiment No. 8, the napping of fiber was found on the surface of the product to deteriorate the appearance.

In Experiments Nos. 9 to 14, the content of asbestos was varied.

When the content of asbestos was less than 1 wt.%, as Experiments No. 9 and No. 10, the times for taking up was too much whereby decrease of the vat level and increase of discharged water were caused and the operations were not easy.

The products were peeled off and had low strength and could not be used in practice.

In Experiment No. 11 wherein the content of asbestos was 1 wt.%, the times for taking up was 10 times and the slight peeling off was found but both of the bending strength and the impact strength were remarkably high.

In Experiment No. 12 wherein the content of asbestos was 3 wt.%, the times for taking up was substantially same with that of the asbestos slate and no peeling off was found. Since the content of glass fiber was remarkably lower than that of Experiment No. 11, both of strengths were slightly lower than those of No. 11 but were enough.

In Experiment No. 13, wherein the content of asbestos was 5 wt.%, both of strengths were higher than those of No. 12.

The increases of the strengths were not so remarkable though the content of the asbestos was remarkably high.

In Experiment No. 14 wherein the content of asbestos was further increased, both of strengths were higher than those of No. 13 in average, however, fluctuation of the strengths was high to include 320 Kg/cm$^2$ as maximum and 140 Kg/cm$^2$ as minimum and the unevenness of strengths of the product was found.

In Experiments Nos. 15 to 21, the content of pulp was varied.

In Experiments Nos. 15 to 17 of 0 to 1 wt.% of pulp, the times for taking up was about 2 times to that of the asbestos slate to decrease workability. However, both of strengths were high enough for practical use.

When the content of asbestos is higher than that of Experiment No. 17, the times for taking up is lower than that of Experiment No. 17 and both of strengths is improved to be remarkably higher than those of No. 16.

In Experiments No. 18 and No. 19, both of strengths, the time for taking up and the peeling property were improved.

In Experiment No. 20 wherein the content of pulp was 9 wt.%, both of strengths were lower than those of Experiments No. 18 and 19.

In Experiment No. 21, the decreases of strengths were remarkable and non-combustible property of the product was deteriorated.

In Experiments Nos. 22 to 24, the other examples of the invention were shown. The contents of asbestos and pulp were relatively low, whereby the times for taking up were slightly high but the peeling property and both of strengths were enough.

In Experiment No. 22, 3 wt.% (½) of the glass fiber was blended in the vat but 3 wt.% (½) of the glass fiber was sprayed on the endless felt. Both of strengths were slightly lower than those of No. 5 using substantially same amount of glass fiber. However, the strength in perpendicular direction is increased to decrease variation of strength in directions.

In Experiment No. 23, 4 wt.% of glass wool and 3 wt.% of the chopped strand having a length of 15 mm were used as glass fiber.

In Experiment No. 24, chopped strand having a length of 30 mm and chopped strand having a length of 10 mm were used at a ratio of 1 : 1. When a part of asbestos in the asbestos slate was substituted with slag wool, rock wool, polypropylene fiber or the like in the fiber reinforced cementitious substrates, the fiber reinforced cementitious substrates of the invention had superior bending strength and impact strength in comparison with the experiments using same contents of glass fiber and asbestos. For example, a fiber reinforced cementitious substrate prepared by the sheeting operation using 2.5 wt.% of polypropylene fiber (length of 15 mm), 6 wt.% of asbestos, 3 wt.% of pulp and the remainder of Portland cement, had 130 Kg/cm$^2$ of the bending strength and 2.5 Kg. cm/cm$^2$ of the impact strength.

A fiber reinforced cementitious substrate prepared by the sheeting operation using 5 wt.% of slag wool, 4 wt.% of asbestos, 4 wt.% of pulp and the remainder of Portland cement, had 125 Kg/cm$^2$ of the bending strength and 3 Kg. cm/cm$^2$ of the impact strength.

Both of the bending strength and the impact strength were remarkably lower than those of the products wherein polypropylene fiber or slag wool was substituted with glass fiber.

As shown in Table 1, when 1 to 10 wt.% of glass fiber, 1 to 10 wt.% of asbestos, 0 to 10 wt.% of pulp and the remainder of the cementitious material were blended to prepare each slurry and each wet film was formed by the sheeing operation and each green sheet was prepared by taking up the wet film on a making roll, the sheeting characteristic was excellent, without remakable decrease of the vat level and without remarkable increase of solid content in the discharged water and without falling down of the wet film. The resulting glass fiber reinforced cementitious substrates had excellent bending strength and impact strength without peeling off.

As shown in Experiments Nos. 4, 5, 12, 18, 19, 22, 23 and 24, it is preferable to use mixtures of 2 to 8 wt.% of glass fiber, 2 to 5 wt.% of asbestos, 1 to 7 wt.% of pulp (4 to 10 wt.% of total of asbestos and pulp) and 82 to 94 wt.% of cementitious material.

It is preferable to give 0.6 to 6 of a ratio of glass fiber to asbestos. As shown in Experiment No. 3, when the content of glass fiber was relatively low, both of bending strength and impact strength were relatively low.

When the ratio of glass fiber to asbestos is higher than 0.6, enough strength were imparted. On the contrary, when the ratio of glass fiber to asbestos is higher than 6, the peeling off was caused and the times for taking up were remarkably increased, disadvantageously.

Table 2

| Experiment No. | No. 26 | No. 27 | No. 28 | No. 29 | No. 30 |
|---|---|---|---|---|---|
| Glass fiber (wt.%) | 0.5 | 1 | 2 | 3 | 4 |
| Cotton (wt.%) | | | | 0.5 | 0.4 |
| Flax (wt.%) | | | | | |
| Wool (wt.%) | 0.5 | 0.5 | 0.3 | | |
| Silk (wt.%) | | | | | |
| Pulp (wt.%) | 5 | 5 | 6 | 8 | 5 |
| Asbestos (wt.%) | — | — | — | — | — |
| Bending strength (Kg/cm$^2$) | 140 | 185 | 192 | 228 | 240 |
| Impact strength (Kg·cm/cm$^2$) | 3.5 | 8 | 9 | 10 | 11.5 |
| Times for taking up (times) | 8 | 8 | 7 | 5 | 8 |
| Peeling property | A | A | A | A | A |
| Note | | | | | *8 |

| Experiment No. | No. 31 | No. 32 | No. 33 | No. 34 | No. 35 |
|---|---|---|---|---|---|
| Glass fiber (wt.%) | 5 | 6 | 8 | 10 | 12 |
| Cotton (wt.%) | | | | | |
| Flax (wt.%) | 0.5 | | | | |
| Wool (wt.%) | | *9 0.6 | | 0.5 | 0.6 |
| Silk (wt.%) | | | 0.5 | | |
| Pulp (wt.%) | 5 | 3 | 6 | 5 | 5 |
| Asbestos (wt.%) | — | — | — | — | — |
| Bending strength (Kg/cm$^2$) | 253 | 260 | 266 | 270 | 265 |
| Impact strength (Kg·cm/cm$^2$) | 12 | 13.5 | 13.5 | 12.5 | 12.5 |
| Times for taking up (times) | 8 | 12 | 7 | 8 | 7 |
| Peeling property | A | B | A | B | C |
| Note | | *10 | | | |

| Experiment No. | No. 36 | No. 37 | No. 38 | No. 39 | No. 40 |
|---|---|---|---|---|---|
| Glass fiber (wt.%) | 3 | 3 | 4 | 3 | 3 |
| Cotton (wt.%) | | | | | |
| Flax (wt.%) | | | | 0.1 | |
| Wool (wt.%) | 0.02 | 0.03 | 0.05 | | 0.3 |
| Silk (wt.%) | | | | | |
| Pulp (wt.%) | 6 | 6 | 5 | 8 | 5 |
| Asbestos (wt.%) | — | — | — | — | — |
| Bending strength (Kg/cm$^2$) | 130 | 190 | 240 | 230 | 232 |
| Impact strength (Kg·cm/cm$^2$) | 5.5 | 8 | 9 | 10 | 10 |
| Times for taking up (times) | 6 | 6 | 7 | 6 | 8 |
| Peeling property | C | B | B | A | A |
| Note | | | | | |

| Experiment No. | No. 41 | No. 42 | No. 43 | No. 44 | No. 45 |
|---|---|---|---|---|---|
| Glass fiber (wt.%) | 4 | 3 | 3 | 3 | 3 |
| Cotton (wt.%) | | 1 | | | 5 |
| Flax (wt.%) | | | | | |
| Wool (wt.%) | *11 0.5 | | 2 | | |
| Silk (wt.%) | | | | 3 | |
| Pulp (wt.%) | 5 | 6 | 4 | 5 | 8 |
| Asbestos (wt.%) | — | — | — | — | — |
| Bending strength (Kg/cm$^2$) | 240 | 233 | 235 | 233 | 230 |
| Impact strength (Kg·cm/cm$^2$) | 10.5 | 10 | 9.5 | 10.5 | 10 |
| Times for taking up (times) | 8 | 6 | 8 | 7 | 5 |
| Peeling property | A | A | A | A | A |
| Note | | | | | *12 |

| Experiment No. | No. 46 | No. 47 | No. 48 | No. 49 |
|---|---|---|---|---|
| Glass fiber (wt.%) | 4 | 3 | 3 | 4 |
| Cotton (wt.%) | | 0.4 | | 0.25 |
| Flax (wt.%) | 0.9 | | 0.3 | 0.25 |
| Wool (wt.%) | | 0.4 | | |
| Silk (wt.%) | | | 0.3 | |
| Pulp (wt.%) | 2 | 5 | 5 | 6 |
| Asbestos (wt.%) | — | — | — | 1 |
| Bending strength (Kg/cm$^2$) | 228 | 231 | 215 | 241 |
| Impact strength (Kg·cm/cm$^2$) | 8.5 | 10 | 9 | 11 |
| Times for taking up (times) | 11 | 7 | 8 | 6 |
| Peeling property | B | A | A | A |
| Note | | | | |

In Experiments Nos. 26 to 35, the content of glass fiber was varied.

In Experiment No. 26 wherein the content of glass fiber was less than 1 wt.%, both of strengths were too low in practical use. On the contrary, in Experiment No. 35 wherein the content of glass fiber was more than 10 wt.%, the peeling off was found disadvantageously.

In Experiment No. 34 wherein the content of glass fiber was 10 wt.%, the slight peeling off was found.

In optimum examples of Experiments Nos. 29 to 31 and No. 33, the bending strength was same with that of the asbestos slate and the impact strength was higher than 4 times to that of the asbestos slate. The sheeting characteristic was substantially same with that of the asbestos slate and no peeling off was found advantageously.

In Experiments Nos. 27 and 28 wherein the content of glass fiber was slightly smaller than the others, the bending strength was lower than that of the asbestos slate but the impact strength was higher than 3 times to that of the asbestos slate. The sheeting characteristic was same and the peeling property was superior to that of the asbestos slate.

In Experiment No. 32 wherein the content of pulp was relatively small, the sheeting characteristic was slightly low and the slight peeling off was found but both of strengths were high enough.

In Experiments Nos. 36 to 45, the content of the specific fiber of wool, cotton, flax or silk was varied.

In Experiment No. 36 wherein the content of the specific fiber was less than 0.03 wt.%, both of the bending strength and the impact strength were low and the peeling off was found disadvantageously.

The impact strength was low but was more than 2 times to that of the asbestos slate.

In Experiments Nos. 37 and 38 wherein the content of the specific fiber was more than 0.03 wt.%, the peeling property was slightly inferior but the sheeting characteristic and the bending strength were high enough and the impact strength was higher than 3 times to that of the asbestos slate.

In the optimum examples of Experiments Nos. 39 to 44, the sheeting characteristic and the bending strength were same with those of the asbestos slate, and no peeling off was found and the impact strength was about 4 times to that of the asbestos slate.

In Experiments Nos. 42 to 44, wherein 1 to 3 wt.% of wool, cotton, flax or silk was blended, the strengths, the peeling property and the sheeting characteristic were not substantially improved even though the content of the specific fiber was increased.

In Experiment No. 45 wherein the content of cotton was 5 wt.%, the strengths and the peeling property were satisfactory but the amount of wet film adhered on the endless felt was too much whereby a partial falling down may be caused to be hard sheeting operation.

In Experiment Nos. 46 to 49 as the examples of the invention, the bending strength was substantially same with that of the asbestos slate but the impact strength was remarkably superior to that of the asbestos slate. As it is clear from the data, the fiber reinforced cementitious substrates having excellent impact strength can be obtained by sheeting a slurry of cementitious material containing glass fiber, pulp and the specific fiber selected from the group consisting of cotton, flax, hemp, wools and silk. Among them, the excellent results were attained by sheeting a slurry of 2 to 8 wt.% of glass fiber, 0.1 to 3 wt.% of a specific fiber selected from the group consisting of cotton, flax, hemp, wools and silk 3 to 10 wt.% of pulp and the remainder of the cementitious material and taking up on a making roll.

In accordance with the process of the invention, the glass fiber reinforced cementitious substrate having excellent impact strength can be easily prepared in high productivity by sheeting a slurry of glass fiber, asbestos and pulp or a slurry of glass fiber, the specific fiber and pulp and taking up on a making roll.

Various modifications can be applied.

We claim:

1. A process for preparing a glass fiber-reinforced cement sheet which comprises dewatering a cement-containing slurry on a wire to form a wet film and winding said wet film on a making roll; the improvement which comprises utilizing in the process an aqueous, cement-containing slurry having a solid content of from 2–30 wt% and wherein the solid component of said slurry comprises 1 to 10 wt% glass fibers, and at least one member selected from the group consisting of 1 to 10 wt% asbestos and 0.03 to 5 wt% of a specific fiber wherein said specific fiber is selected from the group consisting of cotton, flax, hemp, wools and silk with the remainder cement material.

2. The process for preparing a glass fiber-reinforced cement sheet of claim 1, wherein the solid portion of said slurry comprises 1 to 10 wt.% glass fiber; 1 to 10 wt.% asbestos; 0 to 10 wt.% pulp and 80 to 97 wt.% cement material.

3. The process for preparing a glass fiber-reinforced cement sheet of claim 2, wherein the solid portion of said slurry comprises 2 to 8 wt.% glass fiber; 2 to 5 wt.% asbestos; 1 to 7 wt.% pulp and 80 to 95 wt.% cement material.

4. The process for preparing a glass fiber reinforced cement sheet of claim 3, wherein the total content of asbestos and pulp is in the range of 4 to 10 wt.%.

5. The process for preparing a glass fiber reinforced cement sheet of claim 2, wherein the ratio of glass fiber to asbestos is in the range of 0.6 to 6.

6. The process for preparing a glass fiber reinforced cement sheet of claim 1, wherein the solid component of the slurry comprises 1 to 10 wt.% glass fiber; 0.03 to 5 wt.% of said specific fiber; 3 to 10 wt.% of pulp and 75 to 95.97 wt.% cement material.

7. The process for preparing a glass fiber reinforced cement sheet of claim 6, wherein the solid component of said slurry comprises 2 to 8 wt.% glass fiber; 0.1 to 3 wt.% specific fiber; 3 to 10 wt.% pulp and 79 to 94.9 wt.% cement material.

8. The process for preparing a glass fiber reinforced cement sheet of claim 6, wherein the solid component of said slurry comprises 2 to 8 wt.% glass fiber; 0.2 to 1 wt.% cotton or wool; 3 to 10 wt.% pulp and 81 to 94.8 wt.% cement material.

9. The process for preparing a glass fiber reinforced cement sheet of claim 1, wherein said glass fiber having a length of 3 to 100 mm is used.

10. The process for preparing a glass fiber reinforced cement sheet of claim 9, wherein said glass fiber is a chopped strand having a length of 3 to 100 mm.

11. The process for preparing a glass fiber reinforced cement sheet of claim 1, wherein said slurry is fed to a vat and the solid components in the slurry are sheeted by a wire gauze type cylindrical roll and are transferred on an endless felt as a wet film and the wet film is wound upon a making roll.

12. The process for preparing a glass fiber reinforced cement sheet of claim 11, wherein a part of glass fiber is fed on the endless felt.

* * * * *